United States Patent

[11] 3,619,499

| [72] | Inventor | Edward A. Petrocelli<br>San Diego, Calif. |
|---|---|---|
| [21] | Appl. No. | 8,570 |
| [22] | Filed | Feb. 4, 1970 |
| [45] | Patented | Nov. 9, 1971 |
| [73] | Assignee | The United States of America as represented by the Secretary of the Navy |

[54] TELEVISION SURVEYING SYSTEM FOR MEASURING MINUTE DISPLACEMENTS
1 Claim, 4 Drawing Figs.

[52] U.S. Cl. ................................................ 178/7.85,
178/7.87, 178/DIG. 36
[51] Int. Cl. .................................................. H01j 29/89
[50] Field of Search .......................................... 178/6, DIG.
1, 6.8, DIG. 29, DIG. 20, DIG. 36; 250/219 WD;
356/160

[56] References Cited
UNITED STATES PATENTS

| 3,320,360 | 5/1967 | Thompson | 178/DIG. 21 |
|---|---|---|---|
| 2,431,824 | 12/1947 | Poch | 178/DIG. 29 |
| 3,449,511 | 6/1969 | Hecker | 178/6.8 |
| 3,419,674 | 12/1968 | Burns et al. | 178/DIG. 21 |

*Primary Examiner*—Robert L. Griffin
*Assistant Examiner*—Richard K. Eckert, Jr.
*Attorneys*—R. S. Sciascia, G. J. Rubens, J. W. McLaren and T. L. Styner

ABSTRACT: Minute relative movements of two bodies can be continuously detected and quantatively recorded in digital numbers by fixing a light source on one body and directing the light to the viewing screen of a television camera tube. All light except a small discrete spot is excluded from the screen, and the number of lines swept from one edge of the raster to the spot is counted during each frame.

INVENTOR.
EDWARD A. PETROCELLI

TELEVISION SURVEYING SYSTEM FOR MEASURING MINUTE DISPLACEMENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Any optical device such as the surveyors transit for measuring small angles, distances, or displacements is slow and is impractical for some purposes. In "bore sighting" the acoustic beam of an array of transducers mounted in the bow of a warship, for example, it is necessary to simultaneously measure the direction of the beam and the precise heading of the ship. Even though the ship may be tied securely to anchors and/or docks it is constantly moving and points on the ship as well as the ship's true heading is constantly changing. Ordinary surveying techniques are of little value here.

STATEMENT OF THE OBJECTS OF THE INVENTION

The object of this invention is to provide an improved system for instantaneously determining the position of a moving point with respect to a stationary point.

A more specific object of this invention is to provide means for quantatively measuring the relative displacement of two points and generating a binary coded digital number suitable for feeding into the storage and computation circuits of a computer.

SUMMARY OF THE INVENTION

The system for attaining the objects of this invention comprises a point source of light mounted on one of two bodies, the relative movements of which are to be measured. On the other body is mounted a television camera so oriented that the light source is approximately centered in the screen. A light absorbing filter covers the screen to eliminate ambient light and the source of light is sufficiently bright to produce within the bounds of the screen a distinct small bright spot. A digital counter, with a start and stop and synchronous termals, is connected to the video output circuit and to the sweep circuits of the camera so that the number of close-spaced sweeps can be counted from the edge of the raster to the spot. With, say, 1,000 sweep lines, the resolution of the camera can be quite high and when the light spot is sharp and well defined, the slightest movement of the camera with respect to the light source promptly appears as a change in count of the counter.

BRIEF DESCRIPTION OF THE DRAWINGS

Other objects and features of this invention will become apparent to those skilled in the art by referring to one embodiment described in the following specification and showing in the accompanying drawing in which.

DESCRIPTION OF THE PREFERRED EMBODIMENT

Figure 1:
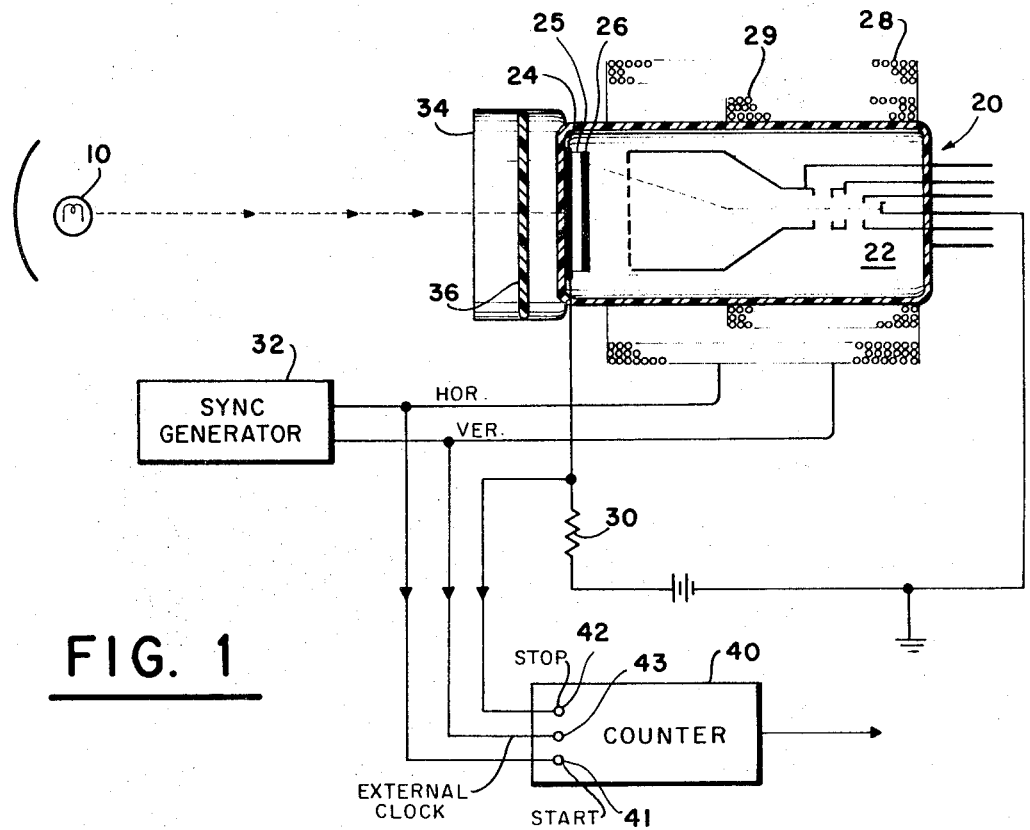
FIG. 1 is a schematic circuit diagram, with a television camera shown in cross section, embodying this invention.

At 10 in FIG. 1 is shown a light source and at 20 is shown a television camera. These two devices are, respectively, mounted upon different supports or bodies the relative motion of which is to be instantaneously and continuously monitored. The light source 10 should be capable of producing at the camera a point source of light which is easily distinguished from the background light.

Many types of television cameras are suitable, although the vidicon is preferred because of its ruggedness, low cost and adaptability to industrial uses. The vidicon shown in FIG. 1 comprises the usual electron gun structure 22 at one end of the envelope for forming and focusing an electron beam upon the other end of the envelope. The beam may be deflected horizontally and vertically by deflection plates or by the deflection coils 28 and 29, shown. The photosensitive screen of the vidicon comprises the transparent conductive film 24 deposited directly on the envelope. Overlaying the conductive film is the photoresist layer 25 upon which is deposited the photoconductive mosaic 26. These three layers are very thin and are on the inside surface of the flat end of the tube. The optical image passes through the transparent film 24 and differently illuminates the middle layer 25. The middle layer 25 is a semiconductor and has the property of extremely high resistance when dark but a relatively low resistance in those areas which are illuminated. The areas between the photoconductive mosaic beads of layer 26 and the conductive film act as tiny capacitors whose dielectric leakage is directly dependent on the light intensity at these areas. As the electron beams scan the screen the video current produces a voltage across the load resistor 30. The horizontal and vertical sawtooth scanning waves are generated by the generator 32 and are connected appropriately to the deflection boils 28 and 29.

Figure 2:
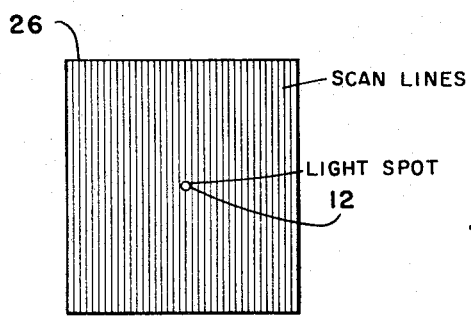
FIG. 2 shows a plan view of the raster of the camera of FIG. 1, with scan lines and light spot.

The only optical image of interest here is a small round spot, and to increase the contrast between the spot and the remainder of the raster, the light shield 34 may be placed over the screen. Inside the shield is placed a darkened light filter to further reduce all ambient light that may fall on the screen. A front view of the screen may be shown as in FIG. 2 where the scan lines are represented within the rectangle of the raster and where the light spot 12 is produced. The close-spaced sweep lines are disposed normal to the expected direction of movement of the light spot. In the example illustrated this sweep is vertical. The sweep lines are produced one after the other from, say, the left-hand boundary. If the entire screen is dark except for the light spot, no signal will occur at the video output of the tube until all vertical lines have been swept between the left-hand boundary and the light spot.

Figure 3:
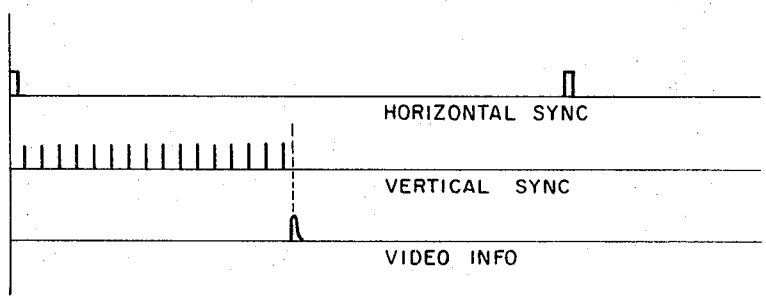
FIG. 3 is a family of curves showing the principal synchronizing pulses and video information employed in the circuits of FIG. 1.

According to an important feature of this invention the counter 40 is provided with a start terminal 41, stop terminal 42 and external clock terminal 43. The start terminal and the clock terminal are connected, respectively, to the horizontal and vertical sweep circuits of the sync generator. The stop terminal is connected to the video output circuit of the television camera tube. If as suggested in FIG. 3, there are 16 vertical sweeps between the starting left edge of the raster and the light spot, the first vertical sync pulses will start simultaneously with the first horizontal pulse and the counting will continue until stopped at the 16th because a video signal occurs at that time in response to the light spot. No interlacing of line is contemplated here. Since the lines are very close together the slightest movement of the light spot is evidenced immediately by a change in the count at the output of the counter. Conveniently, each "horizontal" pulse can reset the counter to zero at the beginning of each frame of the raster. The output of the counter can be fed to a computer where the count may be combined with any other parameters of interest in the positioning of the two bodies mentioned.

Figure 4:
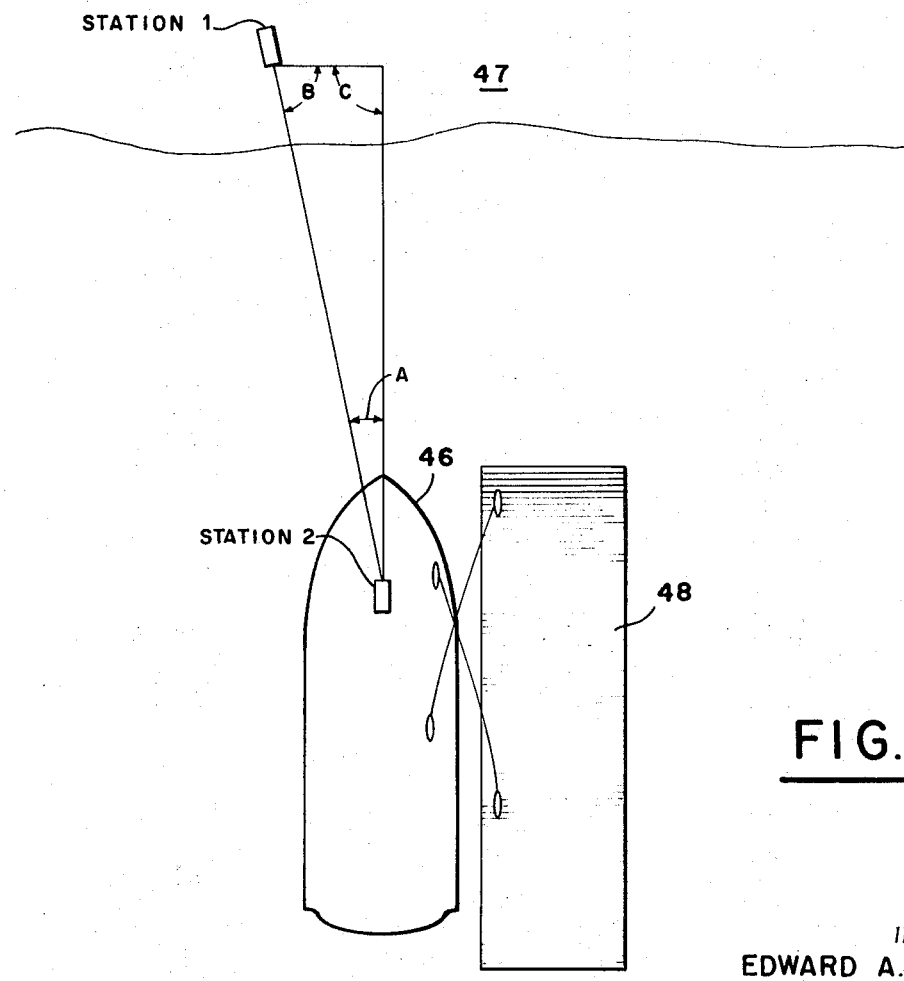
FIG. 4 shows one geometric problem particularly adapted to the equipment of FIG. 1.

FIG. 4 shows one useful application of the surveying instrument of this invention where the precise position of a floating ship must at all times be known. The ship is tied with mooring lines to the dock structure 48 and along the shore line 47 are mounted transducers for bore sighting or measuring the beam characteristics of a transducer array, not shown, in the bow of the ship. Since the mooring lines are flexible and the ship is continuously in motion it is important to continuously and instantaneously read out the heading and side slip of the ship. Conveniently, such readings are made in terms of the angles A, B, and C of a triangle. To solve for the angles and direction of the sides of the triangle, it is preferred that two pairs of light forces and cameras be mounted at points A and B and that the binary coded decimal output of each counter be fed into a common or general purpose computer which can be programmed to instantly solve for the magnetube of any angle or dimension of the triangle.

Obviously many modifications and variations of the present invention are possible in the light of the above teachings. It is therefore to be understood that within the scope of the appended claims the invention may be practiced otherwise than as specifically described.

What is claimed is:

1. A system for measuring the movement of one body with respect to another, said system comprising in combination:

a television camera mounted on one body, said camera having a rectangular screen responsive to a light image for forming a corresponding electron image, and having an electron beam-forming and beam deflection means for scanning said screen, and a video output circuit coupled to the circuit of said electron beam, a light source fixedly mounted on the other body with the light directed onto said camera screen to illuminate a relatively small bright spot on the screen, and a light filter in the optical path of said screen to reduce the ambient light which can reach said screen, said light source being bright enough to illuminate and activate a single discrete spot of light on said screen, a synchronous generator having a first output coupled to said electron beam-forming and beam deflection means for providing a first sawtooth voltage of the desired frame frequency of said camera and a second output coupled to said electron beam-forming and beam deflection means for providing a second sawtooth sweep voltage for defining close-spaced parallel lines in each frame, a digital counter having an external start terminal, a clock terminal and a stop terminal, said start and clock terminals being connected, respectively, to said first and second outputs of said synchronous generator, and said stop terminal being connected to said video output circuit for producing a count in said counter proportional to the distance of said light spot from one side of said raster.

* * * * *